United States Patent [19]

David et al.

[11] Patent Number: 4,946,318
[45] Date of Patent: Aug. 7, 1990

[54] MILLING CUTTER WITH REMOVABLE INSERTS

[75] Inventors: Maurice J. A. David, Nantes; Marianneau, Michel E. A., Lamontaghe, both of France; Gilbert Aebi, Trelex; Pierre Raye, Gland, both of Switzerland

[73] Assignees: Stellram S.A., Nyon, Switzerland; Societe Nationale Industrielle et Aerospatiale, Paris, France

[21] Appl. No.: 212,261

[22] Filed: Jun. 27, 1988

[30] Foreign Application Priority Data

Jun. 25, 1987 [CH] Switzerland .................. 240/87

[51] Int. Cl.$^5$ .................. B23C 5/10; B23C 5/04
[52] U.S. Cl. .................. 407/42; 407/61; 407/62; 407/63; 407/114
[58] Field of Search .................. 407/42, 113, 114, 115, 407/116, 61, 62, 63

[56] References Cited

U.S. PATENT DOCUMENTS

| | | | |
|---|---|---|---|
| 3,380,137 | 4/1968 | MacPetrie et al. | 407/113 |
| 3,848,303 | 11/1974 | Faber | 407/114 |
| 4,278,369 | 7/1981 | Jakobs et al. | 407/114 |
| 4,681,488 | 7/1987 | Markusson | 407/114 |
| 4,699,549 | 10/1987 | Shimomura et al. | 407/42 |

FOREIGN PATENT DOCUMENTS

| | | |
|---|---|---|
| 0239045 | 9/1987 | European Pat. Off. . |
| 3425699 | 1/1986 | Fed. Rep. of Germany . |
| 3618574 | 12/1986 | Fed. Rep. of Germany ...... 407/114 |
| 2276892 | 1/1976 | France . |
| 7300644 | 7/1974 | Netherlands .................. 407/114 |

OTHER PUBLICATIONS

Perets et al., "A Self-Adjusting Plate Reamer", Byulleten'Izobreteniy 1959, No. 9, p. 62.

Primary Examiner—William Terrell
Attorney, Agent, or Firm—Young & Thompson

[57] ABSTRACT

The invention relates to a milling cutter which comprises a body (1) having two indentations (4,5) presenting each a housing (4',5') the body of which makes with the longitudinal axis of the body an helix angle which is not equal to zero. In each housing a cutting insert (6,7) is removably fixed which comprises a corner portion emerging on the frontal face (9) of the body and a main or major cutting edge extending beyond along the external lateral rim of the indentation. The shape of this insert and its position on the cutter are such that the radial cutting angle of the cutter varies in decreasing towards the frontal end of the body, and that the clearance angle of the cutter is constant.

11 Claims, 2 Drawing Sheets

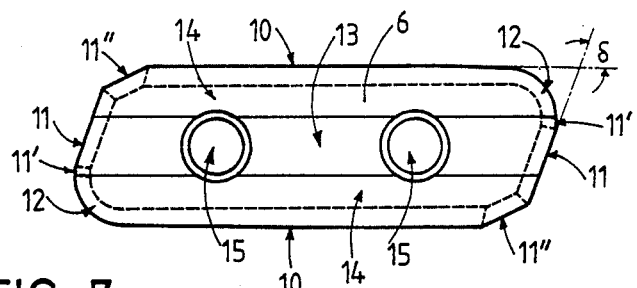
FIG. 5        FIG. 6
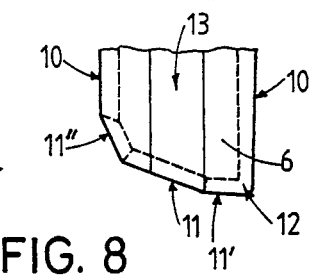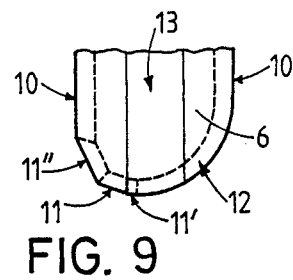
FIG. 7
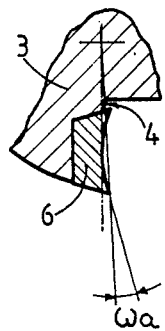    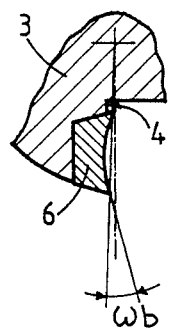
FIG. 8        FIG. 9
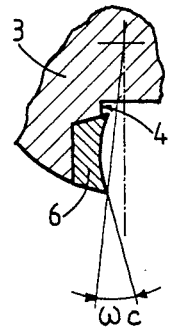
FIG. 10a    FIG. 10b    FIG. 10c

MILLING CUTTER WITH REMOVABLE INSERTS

The present invention is concerning a milling cutter with removable cutting inserts, called milling cutter "for pocketing", as well as the cutting inserts intended to be used with this milling cutter. More particularly, this type of milling cutter called "for pocketing" allows, in addition to the usual slotting and contouring, the penetration into the material to be machined by the combination of an axial displacement and radial movement of the workpiece along at least one of the axes of the table.

Milling cutters with brazed inserts are already known, presenting a variable radial cutting angle or tool side rake, a constant clearance angle and a wedge angle which is variable along the whole cutting height, and which are generally used for finishing operations by contouring, side milling or slotting. However, these cutters present the drawback of necessitating grinding operations with decreasing the initial diameter; furthermore, in case of accidental breakage of an insert, the repairing of such a cutter is expensive since it necessitates a debrazing, a brazing and a grinding. Finally it is necessary to have several different milling cutters for the machining of different materials.

The purpose of this invention thus consists in providing a milling cutter with indexable cutting inserts which obviates the above mentioned drawbacks of the known milling cutters and which are in addition adapted to "pocketing" works. This purpose is achieved by means of the milling cutter according to the invention, which is characterized by the fact that it comprises a body having at least two indentations each receiving a housing, the bottom of which together with the longitudinal axis of the body defines a helix angle not equal to zero, by the fact that in each housing a cutting insert is removably fixed which comprises a corner portion emerging onto the frontal face of the body and a main or major cutting edge extending beyond along the external lateral rim of the indentation, and by the fact that the shape of this insert and its position on the cutter are such that the radial cutting angle of the cutter varies by decreasing towards the frontal end of the body, and that the clearance angle of the cutter is constant.

Thus this invention consists also in a cutting insert to be used with the above defined milling cutter of the invention, and which is characterized by the fact that it possesses the general shape of a parallelogram, the two long sides forming two main or major cutting edges and the two short sides comprising at least one secondary or major cutting edge and a corner portion, by the fact that the included angle between the main or major edge and the secondary or minor edge ranges from 40° to 90°, and by the fact that it comprises a traversing chip-breaker constituted by a longitudinal depression opened at its ends and connected with the main or major cutting edges by a slope with a constant incline.

The annexed drawing shows schematically and by way of example an embodiment of the milling cutter and of the cutting insert according to the invention.

FIGS. 5, 6 and 7 are respectively side view, transversal section view, and plan view of a cutting insert according to the invention.

FIGS. 8 and 9 are schematic views in plan of two variants of the short side and corner portion of a cutting insert according to the invention.

FIGS. 10a, 10b and 10c are partial section views along lines a, b and c of FIG. 4.

Figure 1:
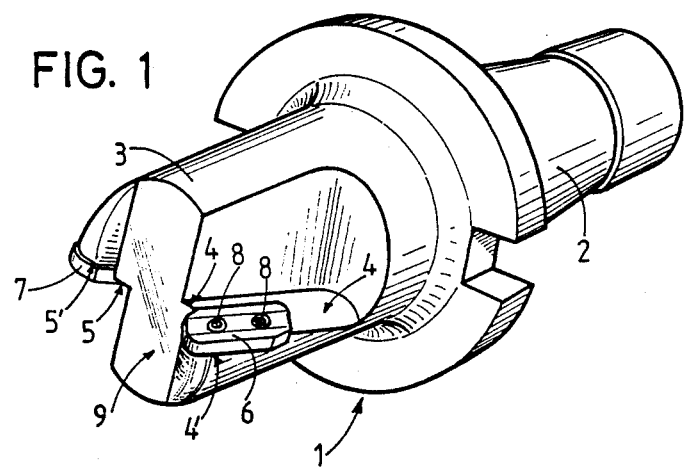
FIG. 1 is a general view in perspective of a milling cutter according to the invention with indexable cutting inserts.

The embodiment of the milling cutter according to the invention, shown for example on FIGS. 1 to 4, comprises a body 1 from which extends on one side a part 2, for example of conical shape, intended to permit the fastening of this body onto the spindle of a machine-tool, and extending from the other side a front part 3, which including two indentations 4, 5 comprising each a slot 4', 5' intended to receive in service position a cutting insert 6, 7.

The bottom of each slot 4', 5' is aligned with the longitudinal axis of the slot, which together with the longitudinal axis of the cutter defines a helix angle corresponding to the axial positioning angle $\gamma_a$ or backrake of the insert on the milling cutter, which should not be equal to zero and which generally ranges from between 2° and 20°.

Each cutting insert 6, 7 is fixed in a removable manner in the slot 4', 5' provided in each indentation 4, 5, by means of two screws 8, disposed in such a way that they tends to push the insert against the walls of said housing.

The front part 3 of the body of the cutter 1 further includes a frontal clearance 9. This clearance is provided in order a combination of radial and axial penetration into the material to be machined by an angle $\gamma$ which is comprised between 5° and 30°. This penetraton angle $\phi$ depends on one part on the diameter of the milling cutter and on the other part on the sizes of the cutting insert as well as of the included angle and/or corner shape thereof.

By way of example only, the cutter may include diameters (D) of 40 to 60 mm, and to each diameter corresponding preferred characteristic angles, as follows:

| D (mm) | 40 | 50 | 60 |
| --- | --- | --- | --- |
| $\gamma a$ | 10° | 5° | 5° |
| $\alpha r$ | 13° | 10° | 10° |
| $\alpha fp$ | 8° | 13° | 13° |
| $\alpha fc$ | 13° | 15° | 15° |

(a = axial; r = radial; fp = frontal — insert and fc = frontal — body)

Of course, depending on the applications foreseen, other diameters and other angles or tool are possible, the effective radial cutting angle being side rake variable on the cutter −10° and +35°, preferably from 1° to 25°.

FIGS. 5 to 7 illustrate by way of example a cutting insert 6 usable with the body of the milling cutter 1 described by reference to FIGS. 1 to 4. This insert 6 has two main or peripheral cutting edges 10, slightly curved outwardly, minor cutting edges 11, 11', 11" and two corner portions 12. The general shape of the insert is that of a parallelogram, with included angle $\gamma$ between 40° and 90°, according to the diameter of the cutter and taking into account the penetration angle $\gamma$ which is wished; here the included angle is of the order of 70°. The configuration of the corner portion and of the minor cutting edge may be different as illustrated for example on FIGS. 8 and 9.

The cutting insert 6, as shown on FIGS. 5 to 7, includes a traversing chip-breaker constituted by a longitudinal open depression 13 connected to the main cutting edges 10 by a slope 14 with a constant incline, here with an angle $\chi$ of about 12°. Furthermore, the clearance angle $\alpha$ varies along the major cutting edges 10, in such a way that said clearance is constant on the cutter, taking into account of the helix angle $\gamma_a$. This clearance angle generally ranges from between 5° and 20°.

Figure 4:
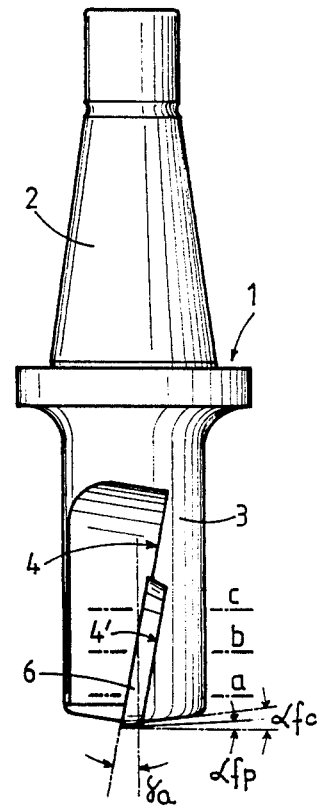

Taking account of the above, the radical cutting angle or toolside rake, which is thus constant on the insert itself (angle $\chi$), effectively varies on the cutter along the longitudinal axis thereof, as represented on FIGS. 10a, 10b and 10c, which are partial sections along lines respectively a, b and c of FIG. 4. It is thus stated that the effective cutting angle or radial rake of the milling cutter decreases towards the frontal end of the body of the cutter 3, from $\omega_a$ to $\omega_b$ and to $\omega_c$. Practically, this angle may vary from $-10°$ to $+35°$, preferably from 1° to 25°.

Finally, both main or major cutting edges 10 and their clearance face or flank are curved outwardly (convex, bulging), so as to avoid, always taking into account the helix angle $\gamma_a$, the geometrical defect of the machined pieces due to the positive axial position of the cutting insert on the milling cutter, and to thus ensure a perfect flatness of the machined surface.

Figure 2:
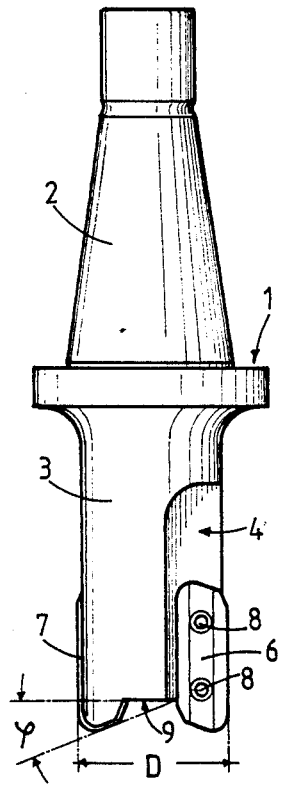
FIGS. 2 and 4 are lateral views, in two different positions, of the milling cutter according to FIG. 1.
Figure 3:
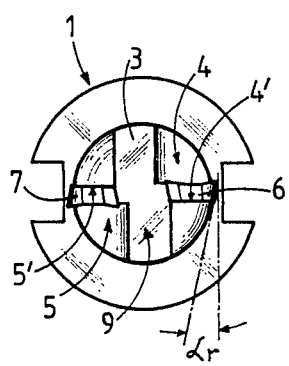
FIG. 3 is an end view of the frontal face thereof.

In order to allow its fastening on the body of the milling cutter 1, each cutting insert is provided with one or more holes 15, here two, having partially conical wall (FIG. 5), intended to receive one or more fastening screws, here two screws 8 (FIGS. 1 and 2).

With regards to the known milling cutters with brazed cutting plates, the milling cutter with indexable cutting inserts according to the invention especially presents the following advantages:

it allows to be carried out "pocketing", i.e., with penetration into material to be machined through the combination of an axial displacement with a radial movement of the piece to be machined along at least one of the axes of the table; as well, cutting inserts having different corner radii and configuration may be used depending on the shape of the workpiece to be machined;

the same milling cutter body may receive a choice of cutting inserts having different hardmetal grades according to the material to be machined;

it avoids the resharpening operations, which are generally tricky and lead to the decrease of the initial diameter; and it also avoids expensive repairs in case of accidental breakage of an insert, since it is thus sufficient to replace the damaged insert by a new insert.

We claim:

1. Milling cutter with removable inserts, comprising a body having front rear portions, said top portion including at least two indentations along the circumference of said front portion, each of said indentations including a slot extending transversely to said circumferential surface of said rear portion, said slot having a longitudinal axis which together with the longitudinal axis of the body defines a helix angle other than zero, a cutting insert removably mounted in each slot, said cutting insert comprising a top surface and a side surface, said top surface and said side surface intersecting to define a main or major cutting edge extending beyond a lateral edge of the slot, said top surface having a depression therein extending longitudinally parallel to the main cutting edge, being open at both ends, and being connected to the cutting edge by a slope which is constant along the longitudinal extent of the insert with respect to a plane containing the longitudinal axis of the slot, said side surface having a slope which varies along the longitudinal extent of the insert with respect to said plane, and the shape of said cutting insert and its position on the cutter being such that the radial rake angle of the cutter decreases towards the front end of the body, and such that the radial clearance angle of the cutter remains constant.

2. Milling cutter according to claim 1, wherein the body comprises two indentations with an indexable cutting insert being received in a slot in each indentation.

3. Milling cutter according to claim 1, wherein the helix angle is constant and ranges from 2° to 20°.

4. Milling cutter according to claim 1, wherein the radial rake angle varies from $-10°$ to $+35°$.

5. Milling cutter according to claim 1, wherein the clearance angle is in the range from 5° to 20°.

6. Milling cutter according to claim 1, wherein said radial rake angle varies from 1° to 25°.

7. Milling cutter according to claim 1, wherein each cutting insert is fixed in a removable manner on the body by at least one screw cooperating with at least one offcenter opening provided in the insert.

8. Cutting insert for use on a milling cutter, having the configuration of a parallelogram and having a top surface having two opposing long sides and two opposing short sides, a bottom surface, and side portions interconnecting said top surface and said bottom surface, said two long sides forming two main or major cutting edges along the top surface of said cutting insert and the two short sides comprising at least one minor cutting edge along said top surface of said insert, with a corner portion connecting intersecting long and short sides, included angle between the intersecting main or major cutting edge and the minor cutting edge is in the range between 40° and 90°, said cutting insert further comprising a longitudinal depression along said top surface opened at its ends and oriented along the longitudinal axis of said cutting insert parallel to said opposing long sides, opposing inclined surfaces connecting said depression with said adjacent major cutting edges with a slope which is constant along the longitudinal extent of the insert with respect to said bottom surface, a said side portion adjacent a said main or major cutting edge and an axis normal to said bottom surface defining therebetween a clearance angle, said clearance angle varying along the longitudinal extent of the insert.

9. Cutting insert according to claim 8, wherein each short side comprises three adjacent intersecting minor cutting edges, between the corner portion and one of the main or major cutting edges.

10. Cutting insert according to claim 8, wherein the lateral extent of said cutting insert along said top surface is greater than the lateral extent of said cutting insert along the opposing bottom surface, said clearance angle ranging from 5° to 20°.

11. Cutting insert according to claim 8, wherein slightly said side portions curve outwardly.

* * * * *